Dec. 20, 1966  H. J. THOMAS  3,292,742
BRAKE
Filed Nov. 3, 1964

INVENTOR
HENRY J. THOMAS
BY *Robert H. Johnson*
ATTORNEY

United States Patent Office 3,292,742
Patented Dec. 20, 1966

3,292,742
BRAKE
Henry J. Thomas, Battle Creek, Mich., assignor to Clark Equipment Company, a corporation of Michigan
Filed Nov. 3, 1964, Ser. No. 408,502
1 Claim. (Cl. 188—119)

This invention relates to brakes, and more specifically to a mechanism for releasing and applying spring applied dual shoe brakes.

A common problem with spring applied dual shoe brakes is that release and engagement of them tends to be rather abrupt, which is undesirable. The abrupt engagement and disengagement of such brakes is particularly undesirable in conjunction with the use of self-propelled hand lift trucks because abrupt operation of the brakes may cause the load being carried by the truck to be dropped or damaged. Consequently, it is a principal object of my invention to provide a dual shoe brake which engages and disengages gradually.

A further object of my invention is to provide a dual shoe brake in which the shoes engage with and disengage from the drum sequentially.

Another object of my invention is to provide improved mechanism for use with a dual shoe brake.

A still further object of my invention is to provide an improved mechanism for actuating sequentially the shoes of a dual shoe brake.

In carrying out my invention in a preferred embodiment thereof, I provide a pair of downwardly depending brake shoe levers pivotally connected to a support, and a brake drum disposed between the levers and fixed to a shaft which is rotatably journaled in the support. A pair of brake shoes are carried by respective ones of the levers and are arranged to engage the brake drum from substantially opposite sides of the periphery thereof. The brake shoes are normally biased into engagement with the brake drum periphery by means of a tension spring connected between the brake shoe levers. A stop is connected to the support and limits the movement of one of the levers in a direction away from the brake drum to no more than a predetermined distance. A bell crank is connected to the other of the levers for pivotal movement about an axis which is substantially parallel to the axis of the pivotal connection of the lever to the support. A rigid link is pivotally connected between the bell crank and the one lever so that actuation of the bell crank in one direction causes the one lever to move into abutment with the stop, further actuation of the bell crank then causing the other lever to move in a direction away from the brake drum with the result that first one brake shoe and then the other brake shoe is disengaged from the brake drum.

Figure 1:
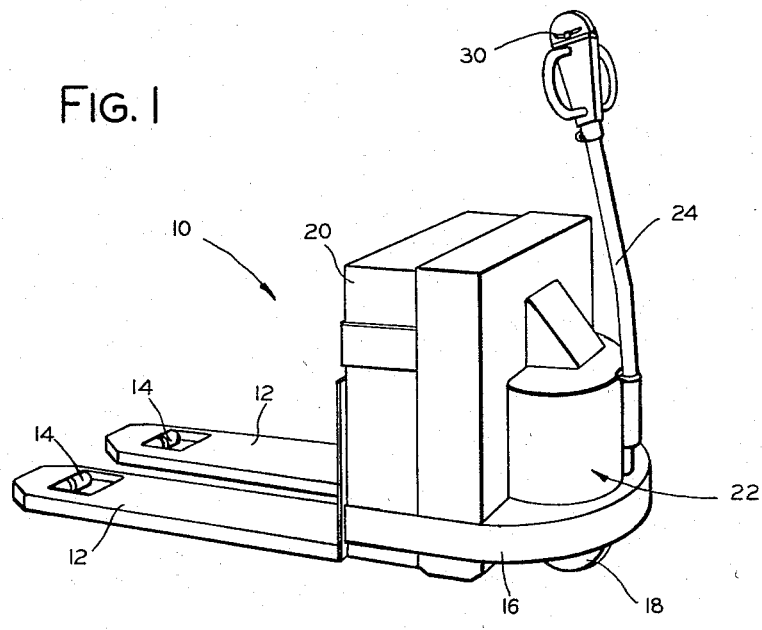
Figure 2:
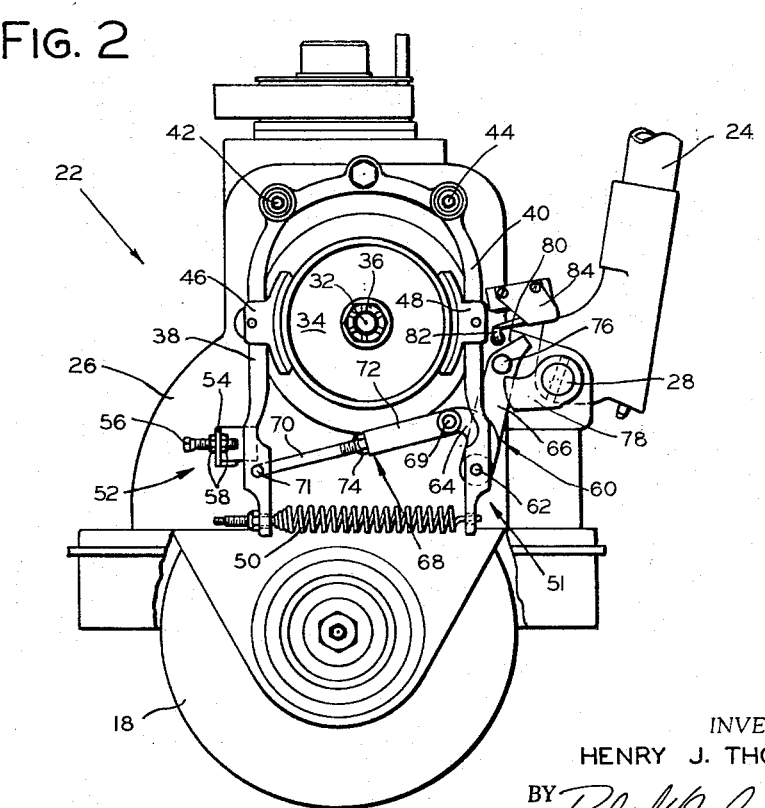

The above and other objects, features and advantages of my invention will become apparent from the following description when taken in conjunction with the accompanying drawing wherein:

FIGURE 1 shows a self-propelled hand lift truck which embodies my invention and, FIGURE 2 shows to advantage my invention mounted on the drive motor assembly of the lift truck of FIG. 1.

Referring to FIG. 1, there is shown a self-propelled electric hand lift truck 10 having a pair of elevatable fork arms 12 supported adjacent one end by trail wheels 14 and connected adjacent the other ends thereof to the truck body 16 which is supported by a single dirigible drive wheel 18. The body 16 carries a battery 20 which serves as a power supply for the various truck functions such as propulsion of the truck and elevation of the fork arms 12.

Referring now also to FIG. 2, dirigible drive wheel 18 is connected to a drive motor assembly 22 which is mounted for approximately 180° rotation about a substantially vertical steering axis. Connected to assembly 22 is an operator's handle 24 which is pivotally connected to assembly housing 26 at 28. The handle 24 is pivotal between substantially vertical and horizontal positions and is equipped with a motor direction and speed control switch 30. As will become apparent as the description proceeds, an operator is able through the use of handle 24 to control the truck motor speed and direction, steer dirigible wheel 18 and apply and release the truck brake.

A shaft 32 which forms part of the drive train to dirigible wheel 18 extends outwardly of assembly housing 26 in which it is rotatably journaled. Fixed to shaft 32 for conjoint rotation therewith, preferably by means of a key (not shown), is a brake drum 34 which is held on shaft 32 by means of a castellated nut 36. Depending downwardly on each side of drum 34 is a pair of brake shoe levers 38 and 40 which are connected to assembly housing 26 at 42 and 44 for pivotal movement about substantially parallel axes. At this point it will be noted that assembly housing 26 functions as a support or reaction member for a portion of the brake, and so may be referred to as a support or support member. A pair of brake shoes 46 and 48 are carried by levers 38 and 40, respectively. The brake shoes are connected to the levers for limited pivotal movements so that they can readily adjust to full contact with the periphery of brake drum 34 when they are biased into engagement with it by tension spring 50 which is connected between the lowermost ends of levers 38 and 40.

A mechanism 51 for releasing the brake shoes 46 and 48 from engagement with brake drum 34 includes an adjustable stop 52 for limiting the movement of lever 38 in a direction away from drum 34. Stop 52 includes a plate 54 fixed to housing or support 26 and having a portion which extends outwardly therefrom. Passing through the outwardly extending portion is a screw 56 which is held in place by a pair of nuts 58 located on each side of plate 54. Preferably screw 56 is adjusted in the embodiment shown to provide from .010 to .015 inch clearance between the end of the screw and the adjacent lever 38 when the brake is engaged. Mechanism 51 also includes a bell crank 60 connected to lever 40 at 62 for pivotal movement about an axis substantially parallel with axes 42 and 44. Bell crank 60 has an arm 64 and an arm 66. Arm 64 is connected to lever 38 by means of a rigid adjustable link 68 which is pivotally connected adjacent one end to arm 64 at 69 and pivotally connected adjacent the other end to lever 38 at 71. Link 68 includes a rod portion 70 which threadedly engages a tubular portion 72, whereby the length of link 68 may be adjusted. The adjustment is maintained by means of a lock nut 74 which threads down rod 70 into abutment with the end of tubular portion 72. Connected to arm 66 of bell crank 60 is an outwardly extending pin 76 which serves as a cam follower and cooperates with a cam member 78 fixed to handle 24 at pivot point 28 for conjoint rotation with handle 24. The end surface 80 of arm 66 also serves as a cam which actuates a cam follower 82 that in turn actuates a normally open microswitch 84.

In order to enable one to better understand my invention, the operation of it will now be explained in conjunction with the hand truck of FIG. 1. It will be assumed that hand truck 10 is stationary with the handle 24 in the substantially vertical position shown in FIG. 1 and that the operator wishes to release the brake holding the truck. In order to release the brake the operator grasps handle 24 and actuates it downwardly, or clockwise, as viewed in FIG. 2, so that cam member 78 engages cam follower 76 and causes arm 66 to move counterclockwise. Counterclockwise movement of arm 66 causes bell crank 60 to pivot about point 62 and link 68 to push on lever 38 which causes lever 38 to move in a direction away from drum 34 into abutment with the end of screw 56 with the result that shoe 46 is moved away from engagement with drum 34. Continued downward or clockwise movement of handle 24 causes continued movement of arm 66 which because lever 38 is prevented from further movement by engagement with stop 52, causes bell crank 60 to pivot counterclockwise about point 69 with the result that lever 40 moves in a direction away from drum 34, whereby brake shoe 48 is moved away from engagement with drum 34. The brake is now completely released and further clockwise movement of handle 24 causes the cam portion 80 of arm 66 to actuate cam follower 82 to close microswitch 84 which serves to energize the electric drive motor.

Assuming now that the lift truck is moving in a forward direction and the operator desires to stop it, he will raise handle 24 or, as seen in FIG. 2, pivot it in a counterclockwise direction. Counterclockwise movement of handle 24 permits bell crank 60 to pivot in a clockwise direction about point 69 so that spring 50 can cause lever 40 to move toward drum 34 and thereby bring brake shoe 48 into engagement with brake drum 34. Further counterclockwise movement of handle 24 now permits bell crank 60 to pivot about point 62 so that lever 38 can be actuated in a direction toward brake drum 34 and bring brake shoe 46 into engagement with brake drum 34.

As now will be obvious from the foregoing description, the brake shoes 46 and 48 are sequentially released from and engaged with brake drum 34. This is especially advantageous when the brake is being applied since with only one brake shoe in engagement with the brake drum the brake is operating at approximately one-half of its capacity with the result that there is not as great a shock when the brake is applied.

As a safety feature cam 78 is arranged so that when the handle 24 is moved to a substantially horizontal position cam 78 no longer engages cam follower 76. When this occurs spring 50 acts to apply the brake. This feature is useful, e.g., if the operator accidentally drops handle 24.

While the preferred embodiment of my invention has been disclosed in conjunction with a hand lift truck, it will be understood that it is not limited to any such use and has other applications as well. Further, the above description is intended to be illustrative only, and so should not be construed as limiting the scope of my invention as defined in the claim appended.

I claim:

In a hand lift truck having a drive motor assembly with a rotatable shaft and journaled for steering movement about a vertical axis, the combination of a steering handle connected to the assembly for pivotal movement about a horizontal axis, a brake drum connected to the rotatable shaft for rotation therewith, first and second brake shoe levers pivotally connected to the assembly and disposed so that the said drum is intermediate them, first and second brake shoes connected to the said first and second levers, respectively, and engageable with the said drum, a spring connected to the said levers so that the said shoes are biased into engagement with the said drum, a stop connected to the assembly, the said first lever being actuatable away from the said drum into abutment with the said stop, a bell crank connected to the said second lever for pivotal movement, the said bell crank including first and second arms extending generally toward the pivotal connection of the said second lever to the assembly, a pin extending from the said second arm, a rigid link connected to the said first lever for pivotal movement and connected to the said first arm for pivotal movement, and a cam connected to the said handle for pivotal movement about the said horizontal axis, the said cam being pivotal to engage the said pin and cause the said second arm to pivot toward the said drum so that the said shoes are moved sequentially away from engagement with the said drum.

References Cited by the Examiner

UNITED STATES PATENTS

| | | |
|---|---|---|
| 1,588,853 | 6/1926 | Norris. |
| 1,946,758 | 2/1934 | Powell _____ 188—166 |
| 1,976,406 | 10/1934 | McGiffert et al. ____ 188—166 X |
| 2,788,093 | 4/1957 | Steinberg et al. _____ 188—119 |

DUANE A. REGER, *Primary Examiner.*